United States Patent [19]
Pirdzuns

[11] Patent Number: 4,920,456
[45] Date of Patent: Apr. 24, 1990

[54] CURRENT SUPPLY ARRANGEMENT FOR HOUSEHOLD APPLIANCES AND METHOD OF MAKING THE SAME

[75] Inventor: Rolf Pirdzuns, Wuppertal, Fed. Rep. of Germany

[73] Assignee: Vorwerk & Co. Interholding GmbH, Wuppertal, Fed. Rep. of Germany

[21] Appl. No.: 246,200

[22] Filed: Sep. 19, 1988

Related U.S. Application Data

[63] Continuation-in-part of Ser. No. 92,060, Sep. 2, 1987, abandoned.

[30] Foreign Application Priority Data

Sep. 2, 1986 [DE] Fed. Rep. of Germany ....... 3629853

[51] Int. Cl.[5] ............ H02B 1/20
[52] U.S. Cl. ............ 361/428; 361/425; 361/426
[58] Field of Search ............ 361/425, 426, 428; 439/395–399, 401, 404, 417, 418

[56] References Cited

U.S. PATENT DOCUMENTS

| | | | |
|---|---|---|---|
| 2,882,513 | 4/1959 | Olashaw | 361/426 |
| 3,201,553 | 8/1965 | Scott . | |
| 3,721,863 | 3/1973 | Hardouin et al. | 361/428 |
| 4,421,964 | 12/1983 | Buchtel . | |
| 4,557,544 | 12/1985 | Esser | 439/395 |
| 4,729,064 | 3/1988 | Singer, Jr. | 361/428 |
| 4,741,032 | 4/1988 | Hampton | 361/426 |

FOREIGN PATENT DOCUMENTS 615737 1/1949 United Kingdom .

*Primary Examiner*—Gregory D. Thompson
*Attorney, Agent, or Firm*—Walter Ottesen

[57] ABSTRACT

The invention is directed to a current supply arrangement for a household appliance which includes a central line supplying multiple-contact units from which the individual electrical components are directly supplied via cutting contacts and/or takeoff contacts. A method for making the current supply arrangement is also disclosed.

8 Claims, 9 Drawing Sheets

CURRENT SUPPLY ARRANGEMENT FOR HOUSEHOLD APPLIANCES AND METHOD OF MAKING THE SAME

RELATED APPLICATION

This is a continuation-in-part of application Ser. No. 092,060, filed on Sept. 2, 1987 and entitled "Current Supply for Household Appliances" abandoned as of 10/24/88.

FIELD OF THE INVENTION

The invention relates to a current supply arrangement for houshold appliances such as floor cleaning-apparatus wherein a central supply line supplies a multiple-contact unit and from there individually and directly supplies the individual electrical components. The invention also relates to a method of making the current supply arrangement.

BACKGROUND OF THE INVENTION

In a manner which is clean and provides a clear overview, the above-mentioned current supply arrangement distributes all electric supply lines such as supply leads and diverse ground leads from a central distributing location to the individual components in the apparatus so that the safety requirements for the user of such apparatus are maintained.

Accordingly, current supplies are known which are configured as a large-volume, flat-plug distributor plate with all individual components having a separate take-off via so-called flat-insert sleeves. So-called crimp-cut contacts for contacting special insulated wires such as varnished wires are also known.

A disadvantage here is that all electrical leads terminate in a corresponding contact and therefore a plurality of contacts are necessary in order to electrically supply all components. This likewise results in a substantial space requirement for such a distributor. This applies also to the above-mentioned crimp-cut contacts.

SUMMARY OF THE INVENTION

In view of the above, it is an object of the invention to provide a current supply arrangement which avoids the above-mentioned disadvantages. It is another object of the invention to provide a current supply arrangement which has only a single supply lead which is subdivided into several connecting leads at only specific locations with the distribution locations being reduced with respect to their structural dimensions while at the same time maintaining all prescribed safety requirements. It is still another object of the invention to provide a method of making the current supply arrangement.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
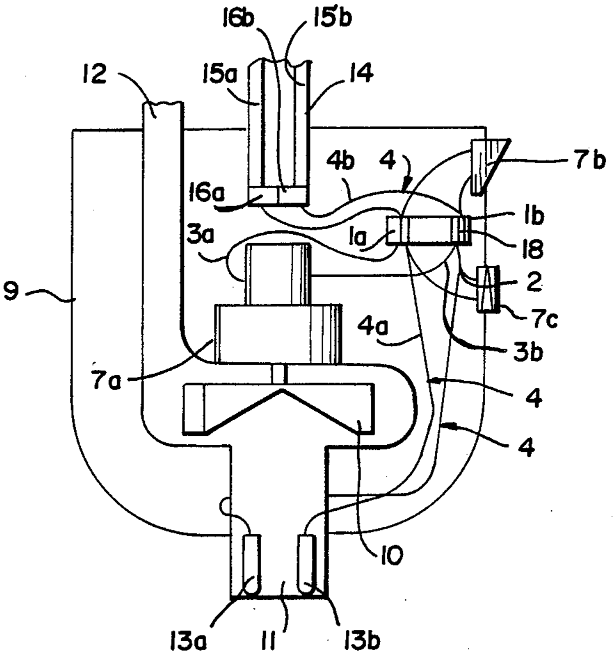
FIG. 1 is a schematic of a part of a housing for a floor-cleaning apparatus wherein a central loop line having two distribution locations is placed and from which the individual components are supplied.

FIG. 1 shows the housing of a floor-cleaning apparatus 9 in which a motor-blower unit 10 having a motor **7*a* as well as an on-off switch 7*b* and a control lamp 7*c* are integrated. The apparatus includes a suction stub 11 and a blowout stub 12. A plug connector having contacts (13*a*, 13*b*) is shown on the suction stub 11** into which it is integrated for electrically supplying accessory components not shown here.

The electrical current supply is provided via the wand 14 of the floor-cleaning apparatus 9 wherein the supply line (**15*a*, 15*b*) is connected to latch contacts (16*a*, 16*b*) from where the loop supply lead 4 begins and continues through two of terminal blocks (1*a*, 1*b*) of a terminal block assembly 18 and extends up to the last contact location which is here identified by the reference numerals (13*a*, 13*b*). The supply lead 4 is laid down during assembly as a single supply lead which will supply the terminal blocks (1*a*, 1*b*) with electrical energy after it is cut at predetermined locations. The contact of leads (4*a*, 4*b*) to respective ones of the terminal blocks (1*a*, 1*b*) are provided by first laying the lead 4 into slotted cavities of the terminal block dimensioned to accept cutting contacts which cut through the insulation of the lead when the contacts are poked into corresponding ones of the cavities thereby establishing electrical contact with the wire strands of the leads. The leads (3*a*, 3*b*) extend from respective terminal block (1*a*, 1*b*) to supply motor 7*a*. The method of the invention will be explained later in greater detail with reference to FIGS. 8 to 13**.

Figure 2:
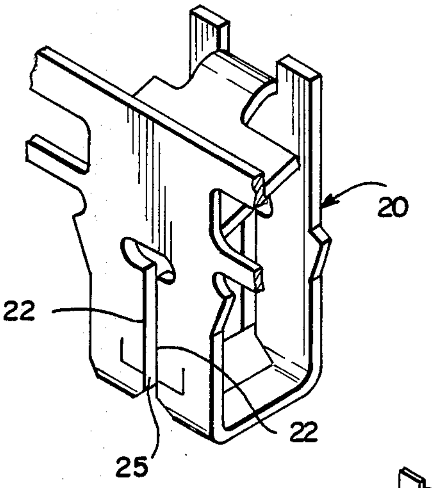
FIG. 2 is a perspective view of a contact suitable for insertion into a slotted cavity of a terminal block.

The terminal block **1*a* can include a plurality of interconnected individual contacts of which one is shown in FIG. 2 where it is identified by reference numeral 20**. A wire is laid down in a slotted cavity of a terminal block and the contact 20 is inserted or poked into the cavity such that the knife-like edges 22 cut through the insulation to come into mechanical and electrical contact with the wire which can be a single lead or a lead made up of a plurality of individual strands of which seven is an advantageous quantity because of the excellent electrical contact made thereto at the edges 22. The strands are then wedged into the gap 25 conjointly defined by the edges 22. Contacts of this kind are commercially available from AMP-Deutschland GmbH as part no. 62420-1.

Figure 3:
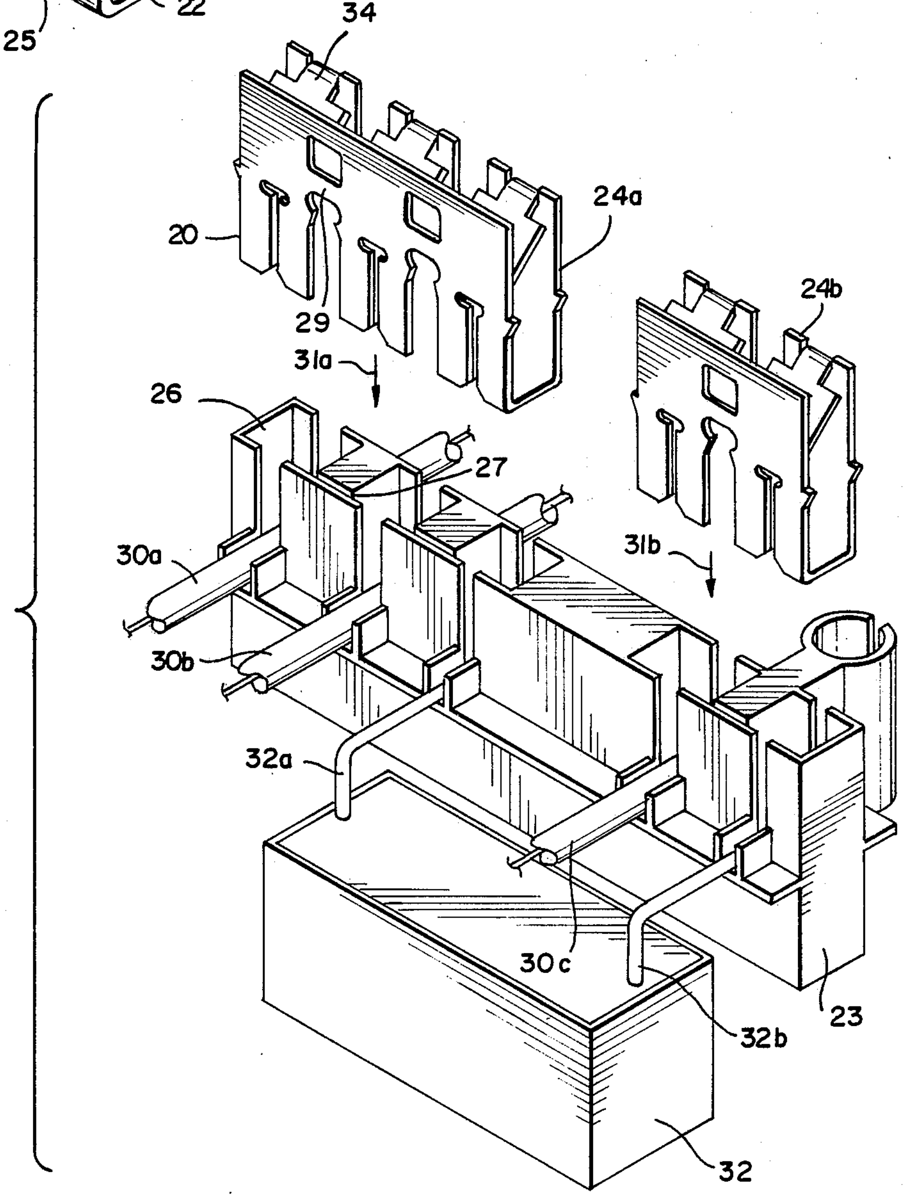
FIG. 3 is a perspective view of a terminal block arrangement shown with two multiple contact pieces about to be inserted into slotted cavities in the terminal block with each of the multiple-contact pieces having a plurality of contacts of the kind shown in FIG. 2.

FIG. 3 is a perspective view of a terminal block 23 and two multiple-contact pieces (24*a*, 24*b*) about to be inserted into slotted cavities 26 of the terminal block. Each of the contact pieces (24*a*, 24*b*) has a plurality of contacts 20 of the kind shown in FIG. 2 which are interconnected so that the contacts of each multiple-contact piece effectively constitute a busbar. The narrow slot 27 is provided to receive the interconnecting segments 29 which interconnect each two mutually adjacent ones of contacts 20 of a multi-contact piece (24*a*, 24*b*) before and after insertion. The leads (30*a*, 30*b*, 30*c*) shown lying in the slotted cavities 26 will be cut at the insulation as described above when the multiple contact pieces (24*a*, 24*b*) are inserted.

The terminal block 23 can be made of NOVODUR plastic which is especially suited for accommodating current conducting parts therein. The leads (30*a*, 30*c*) can correspond to leads (4*a*, 4*b*) in FIG. 1 and can be energy-supply leads. The lead 30*b* can be used to supply a load with lead 30*c* serving as the return. Components can be laid in place as shown for example by the leads (32*a*, 32*b*) of the capacitor 32 which will be effectively connected across the leads (30*a*, 30*c*) when the multiple-contact pieces (24*a*, 24*b*) are poked into the cavities 26.

The terminal block 23 with its cavities 26 accommodates the two multiple-contact pieces or units (24*a*, 24*b*) when the latter are inserted therein by a movement in the downward direction of arrows (31*a*, 31*b*). The cutting contact edges 22 of the contacts 20 cut through the insulation of the leads (30*a*, 30*b*, 30*c*) thereby establishing electrical contact thereto when the pieces (24*a*, 24*b*) are inserted into the cavities 26 of the terminal block 23. The solid leads (32*a*, 32*b*) of capacitor 32 become wedged into the gap 25 of corresponding contacts 20 upon insertion of the pieces (24*a*, 24*b*). A free space 34 is provided in each contact 20 for receiving a takeoff spade contact 36 (FIG. 4).

Figure 4:
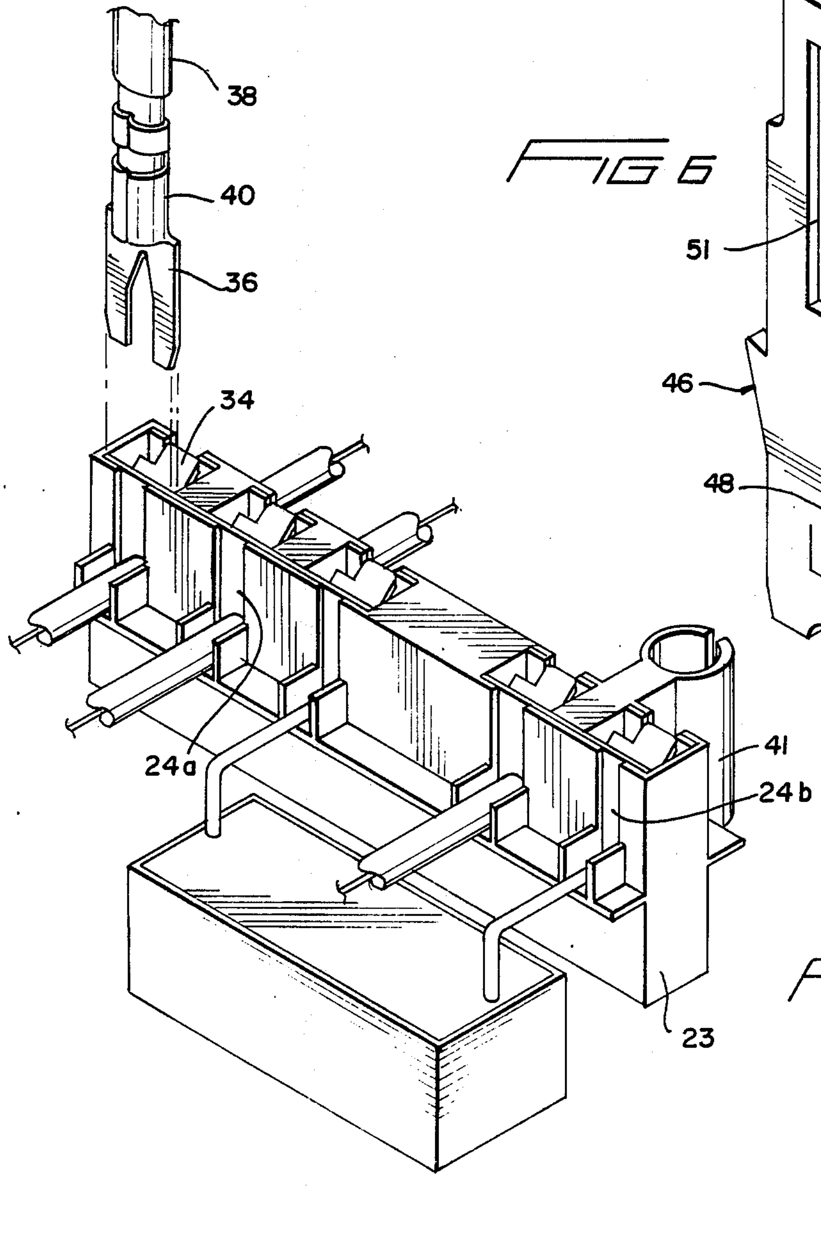
FIG. 4 is a perspective view of the terminal block arrangement of FIG. 3 with the multiple contact pieces inserted and with a spade contact about to be inserted.

FIG. 4 shows the multiple-contact pieces (24*a*, 24*b*) inserted and how the takeoff spade contact 36 of a connecting lead 38 coacts with the multiple-contact piece 24*a* to provide an electrical connection to a component after the pieces (24*a*, 24*b*) have been inserted. The spade contact 36 is crimped to the strands of the connecting lead 38 as indicated at reference numeral 40. The takeoff spade contact 36 is inserted into a space 34 of the piece 24*a* of the terminal block assembly.

Referring now to FIG. 1 and for the purpose of supplying energy for the various components 7*a* to 7*c*, the leads of these components can be provided with takeoff spade contacts which are inserted into the multiple-contact units (1*a*, 1*b*) in the manner shown in FIG. 4. The takeoff spade contacts are electrically connected to the supply and return leads (30*a*, 30*c*) via the multiple-contact units (24*a*, 24*b*) as shown in FIG. 4. Other takeoff connections are possible in the multiple-contact units (1*a*, 1*b*) at remaining ones of the poke-in contact 20.

Figure 5:
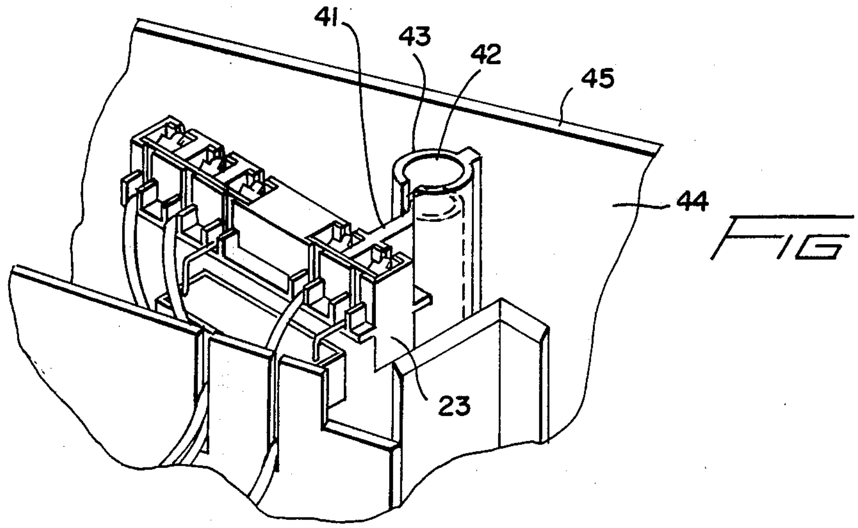
FIG. 5 is a perspective view of a terminal block arrangement of FIG. 4 mounted on the wall of the housing of an electrical appliance such as a vacuum cleaner.

The terminal block 23 can be fully wired outside of the housing of the appliance and later seated therein. For this purpose, the terminal block 23 is provided with an appendage 41 for later mounting in the housing of an appliance. Referring to FIG. 5, the wall 45 is part of a clam shell half of a housing of an appliance such as a vacuum cleaner. The clam-shell housing part is molded so as to have an extension 43 forming an integral part thereof. The extension 43 extends outwardly from the wall surface 44 of the wall 45. The terminal block 23 is simply hung from the wall 45 by inserting the appendage 41 into the opening 42 of extension 43.

Figure 6:
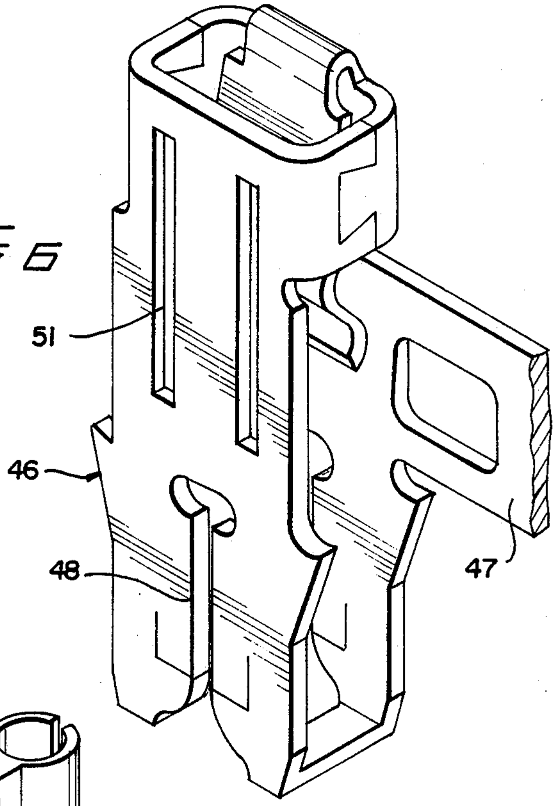
FIG. 6 is a perspective view of another type of poke-in contact.

FIG. 6 shows another type of poke-in contact suitable for use with terminal blocks of the kind described above as well as those shown in FIGS. 8 to 13. These poke-in contacts 46 are also available commercially from AMP-Deutschland GmbH under the trade name MAG-MATE and can be supplied as a single contact or as a plurality of contacts interconnected by extension 47. The cutting edges 48 cut into the insulation of a lead when the poke-in contact is inserted into a slotted cavity wherein the lead wire has been previously laid down.

Figure 7:
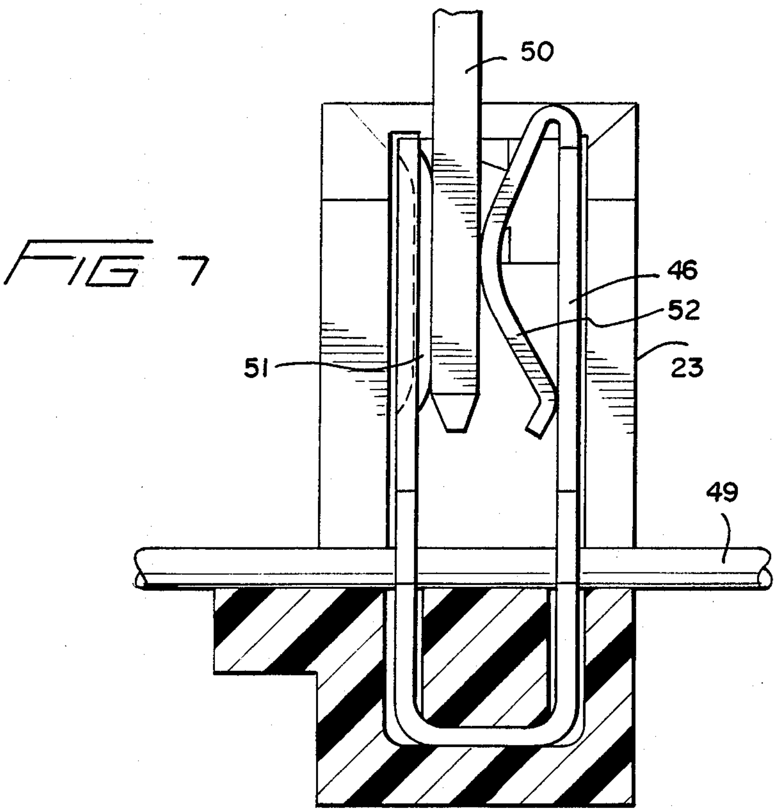
FIG. 7 is a side elevation view, partially in section, of the poke-in contact shown in FIG. 6 seated in a cavity of a terminal block of the kind shown in FIG. 4.

FIG. 7 is a side elevation view of the plug-in contact 46 shown in FIG. 6 wherein the contact is seated in a terminal block 23 and in contact engagement with a lead 49. In FIG. 7, only the terminal block 23 is shown in section. A spade contact 50 has been inserted and is resiliently biased against elongated edge protrusions 51 by means of a resilient tab 52.

Figure 8:
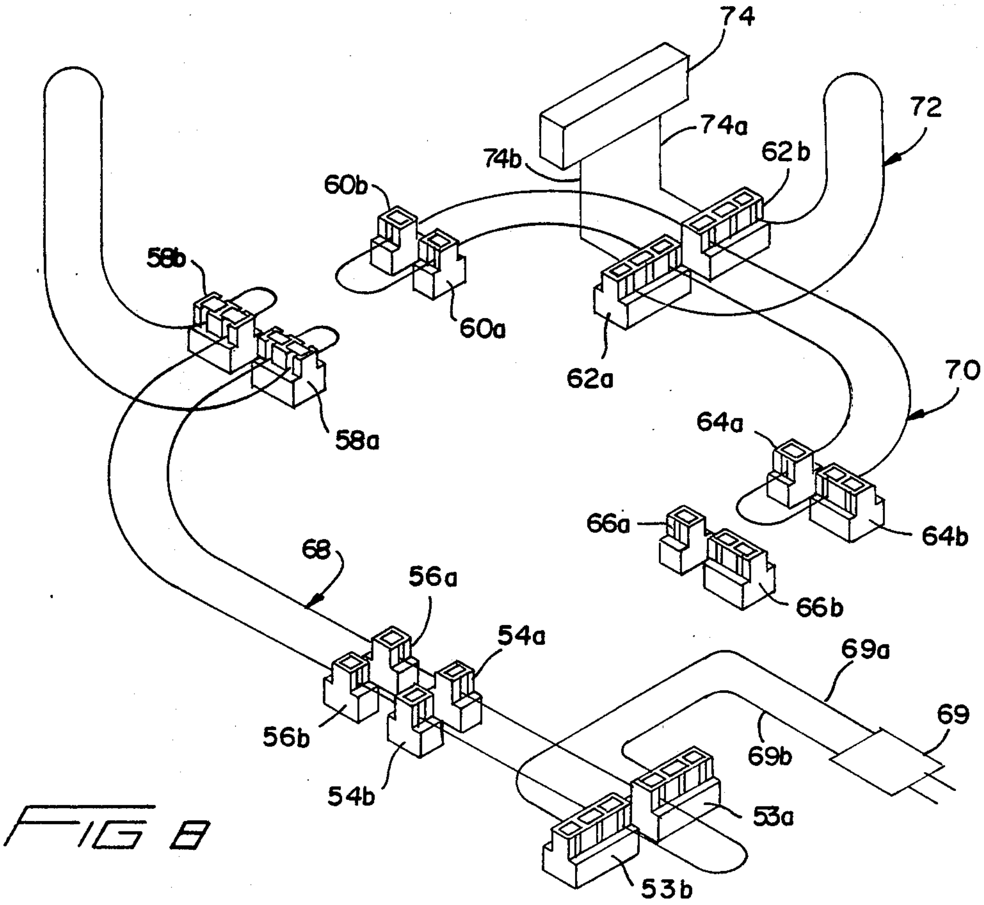
FIG. 8 is a perspective view showing a plurality of terminal blocks in the housing of a household appliance wherein two loop wires have been laid.
Figure 10:
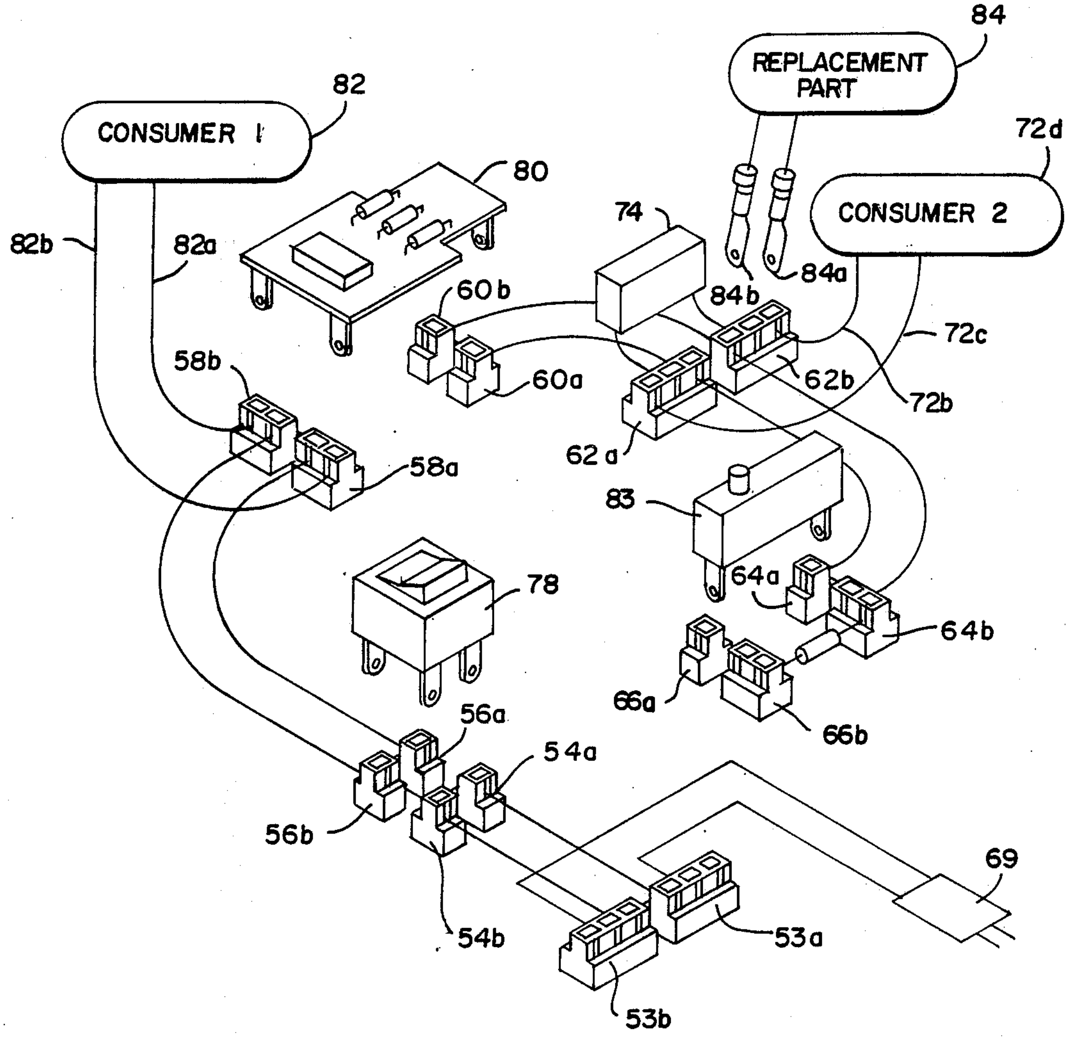
FIG. 10 shows the prewired terminal blocks of FIG. 9 wherein plug-in units are about to be inserted.

FIG. 8 shows a plurality of terminal blocks (53*a*, 53*b*, 54*a*, 54*b*, 56*a*, 56*b*, 58*a*, 58*b*, 60*a*, 60*b*, 62*a*, 62*b*, 64*a*, 64*b*, 66*a*, 66*b*) formed on the inner wall surface of the housing of an appliance such as a vacuum cleaner. In the view shown in FIG. 8, no poke-in contacts have yet been inserted into the terminal blocks. First, two main wire loops 58 and 70 are laid down together with a third loop 72 which will later supply a load 72*d* (FIG. 10). The wires are laid down in appropriate slotted cavities of the terminal blocks. Also, the leads 74*a* and 74*b* of capacitor 74 are laid into appropriate slotted cavities of terminal blocks 62*a* and 62*b*. If required, a component such as a glow lamp (not shown) can be connected across terminal blocks 66*a* and 66*b*. A plug 69 with its supply wires (69*a*, 69*b*) is laid down in respective ones of input terminal block 53*b* and 53*a*.

Figure 9:
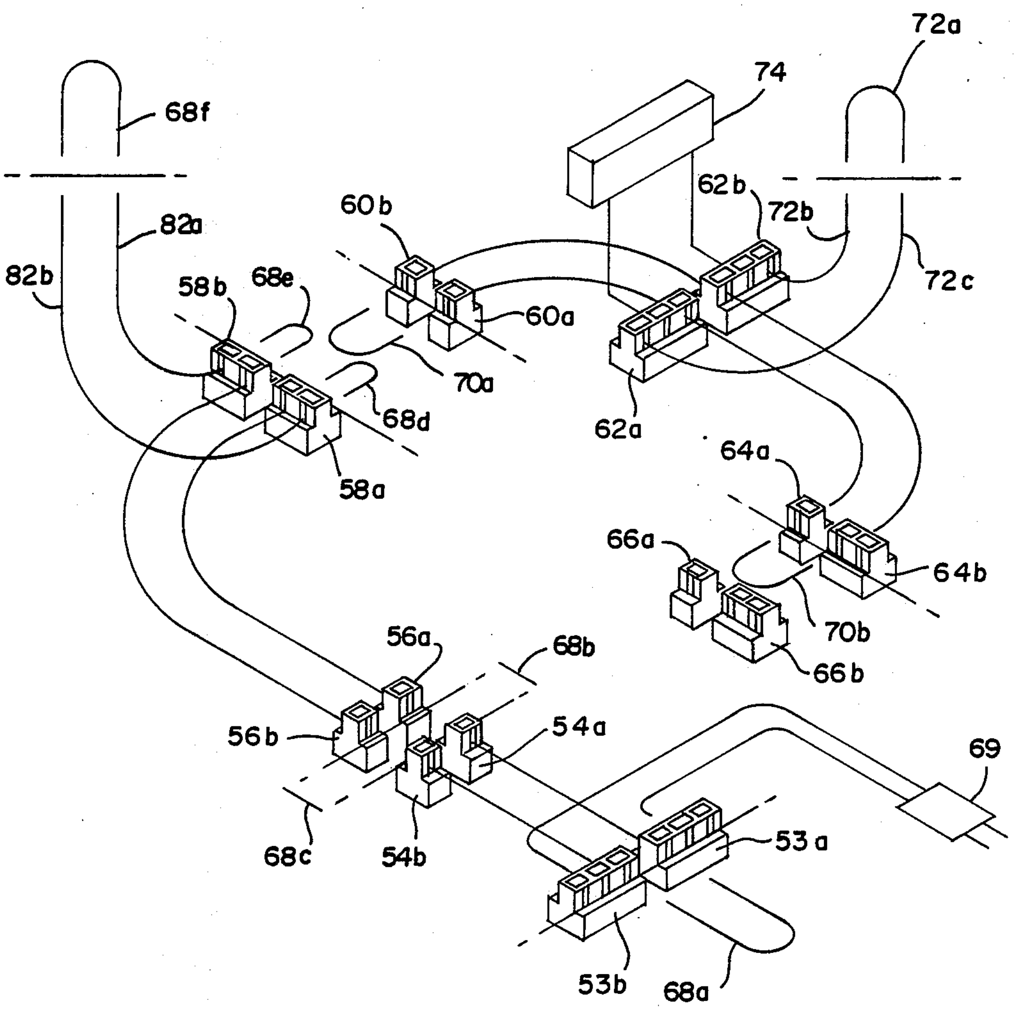
FIG. 9 shows the loop wires of FIG. 8 after contact units have been inserted into the terminal blocks and after they have been cut at predetermined locations.

Thereafter, poke-in contacts of the kind shown in FIGS. 6 and 7 are poked into all of the terminal blocks shown whereafter the wire loops are cut as shown in FIG. 9. The separate wire segments 68*a*, 68*b*, 68*c*, 68*d*, 68*e*, 68*f* are discarded. Likewise, for loop wire 70, segments 70*a* and 70*b* are discarded and for loop 72, segment 72*a* is discarded. Where the terminal blocks have more than one cavity as, for example, block 62*a*, the insert pieces made up of contacts 46 are all interconnected so as to constitute a busbar.

As mentioned above, the terminal blocks shown in FIG. 8 can all be formed on the inner wall surface of the housing of an appliance. Polyamide plastic is a material suitable for such a housing. However, this material is not suitable for current-conducting parts so that the cavities of each of the terminal blocks are preferably lined with NOVODUR plastic.

Thereafter and referring to FIG. 10, the plug-in units 78 (switch), 80 (circuit board), and 83 are inserted. Switch 78 is inserted into corresponding ones of the terminal blocks (54*a*, 54*b*, 56*a*, 56*b*) and printed circuit board 80 is inserted into corresponding ones of terminal blocks (58a, 58b, 60a, 60b). An appropriate load 82 can be connected to the ends of leads (82a, 82b). Likewise a load 72d can be connected to leads (72b, 72c).

If capacitor 74 should fail during use of the appliance, the arrangement according to the invention provides for the convenient replacement thereof by a replacement capacitor 84. The leads of the capacitor 74 are simply cut through and the capacitor 74 discarded. A replacement capacitor 84 is simply inserted into the poke-in terminals with the aid of spade contacts (84a, 84b).

Figure 11:
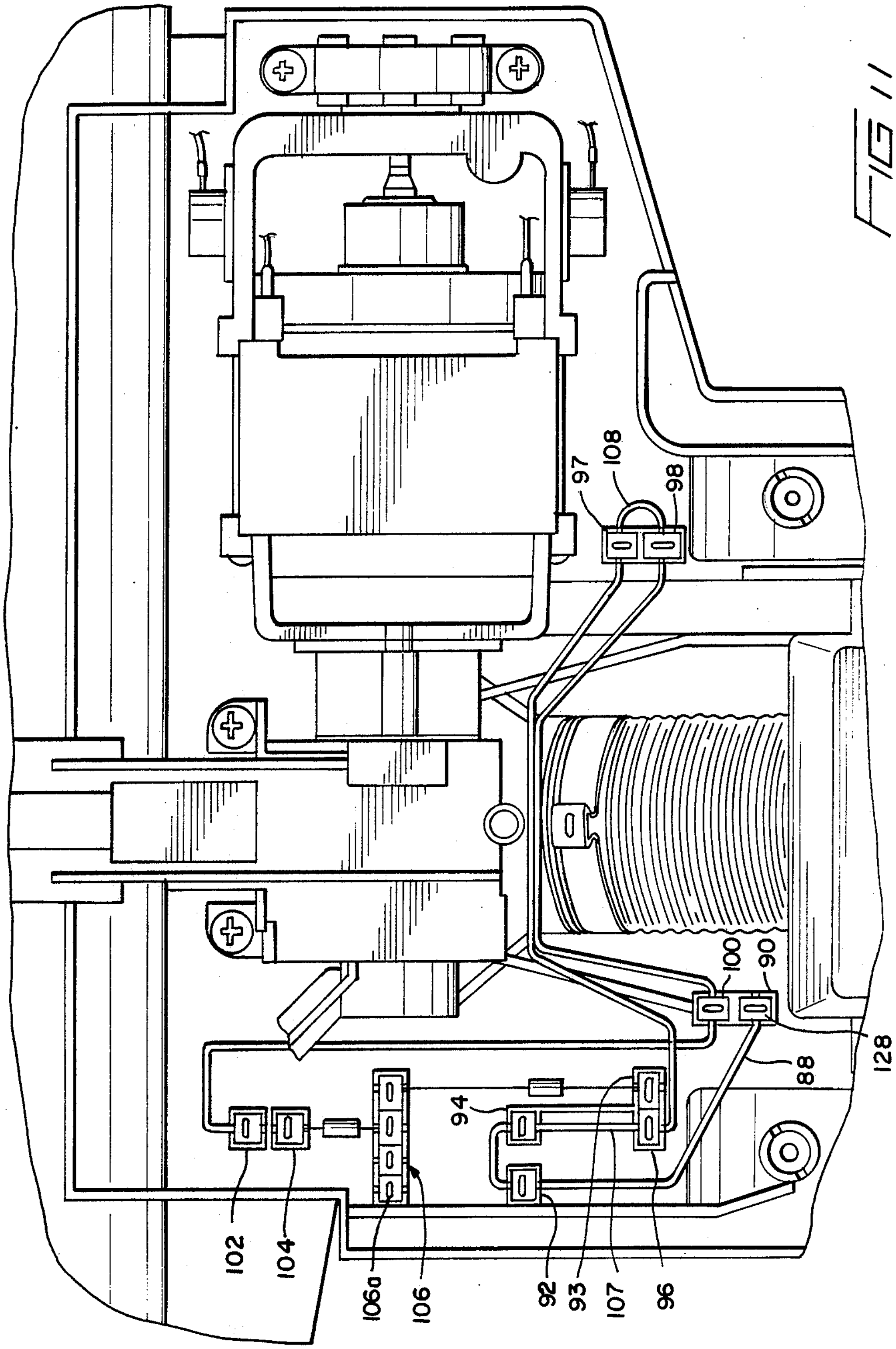
FIG. 11 is a plan view of the clamshell-type housing of a vacuum cleaner showing the plug-in components removed and showing the loop wire passing through all terminal blocks.

FIG. 11 is a plan view of a vacuum cleaner having the current supply arrangement according to the invention. A wire 88 is first laid down into the slotted grooves of a plurality of slotted cavities with the aid of a manufacturing robot unit. Accordingly, during automatic assembly, the wire lead 88 is laid down in the slotted cavity of terminal 90 and then goes to terminal 92, then to terminal 94 and continues through the terminals 96, 97, 98, 100 and ends at terminal 102. In this arrangement, the four terminals making up terminal block 106 are connected together in the manner of a busbar. Terminals 93 and 96 are also connected to each other as a busbar. On the other hand, terminals 90 and 100 are electrically separate as are terminals 97 and 98 as well as 102 and 104.

Thereafter, and preferably also with the aid of a robot unit, the wire is cut so that segments 107 and 108 shown in FIG. 11 are removed. Thereafter, the wiring arrangement appears as in FIG. 12. The leads 110 and 112 of motor 114 can be provided with spade contacts and inserted into terminals 97 and 98, respectively. The current source is brought into the circuit across terminals 90 and 100. Terminals 94 and 96 constitute a plug-in location for an overcurrent switch 116 shown in FIG. 13 and terminals 102 and 104 receive a plug-in microswitch which can be actuated mechanically by an arm 120 (FIG. 12) extending from the motor 114. The motor can be mounted so as to be rotatably movable with respect to the clamshell-type housing 122 in the event that an article becomes snagged in the brush unit 124 of the vacuum cleaner. The motor then rotates with its arm 120 and actuates the microswitch 118 to immediately interrupt the current to the motor. The terminal 106a of terminal block 106 and terminal 92 receive a plug-in glow lamp 126 (FIG. 13).

Figure 12:
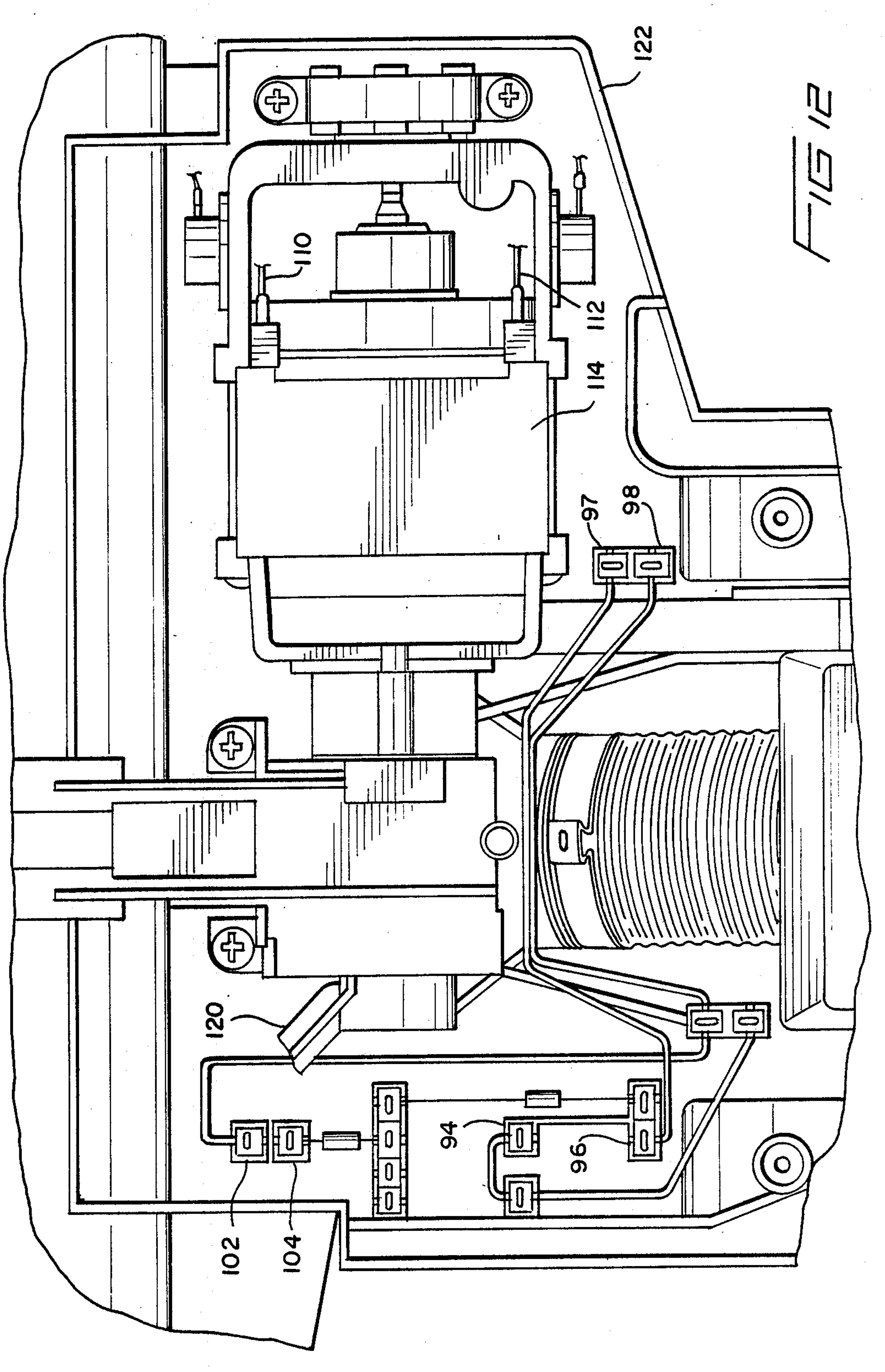
FIG. 12 is the same view as FIG. 11 except that poke-in contacts have been inserted and wire segments removed at two locations.
Figure 13:
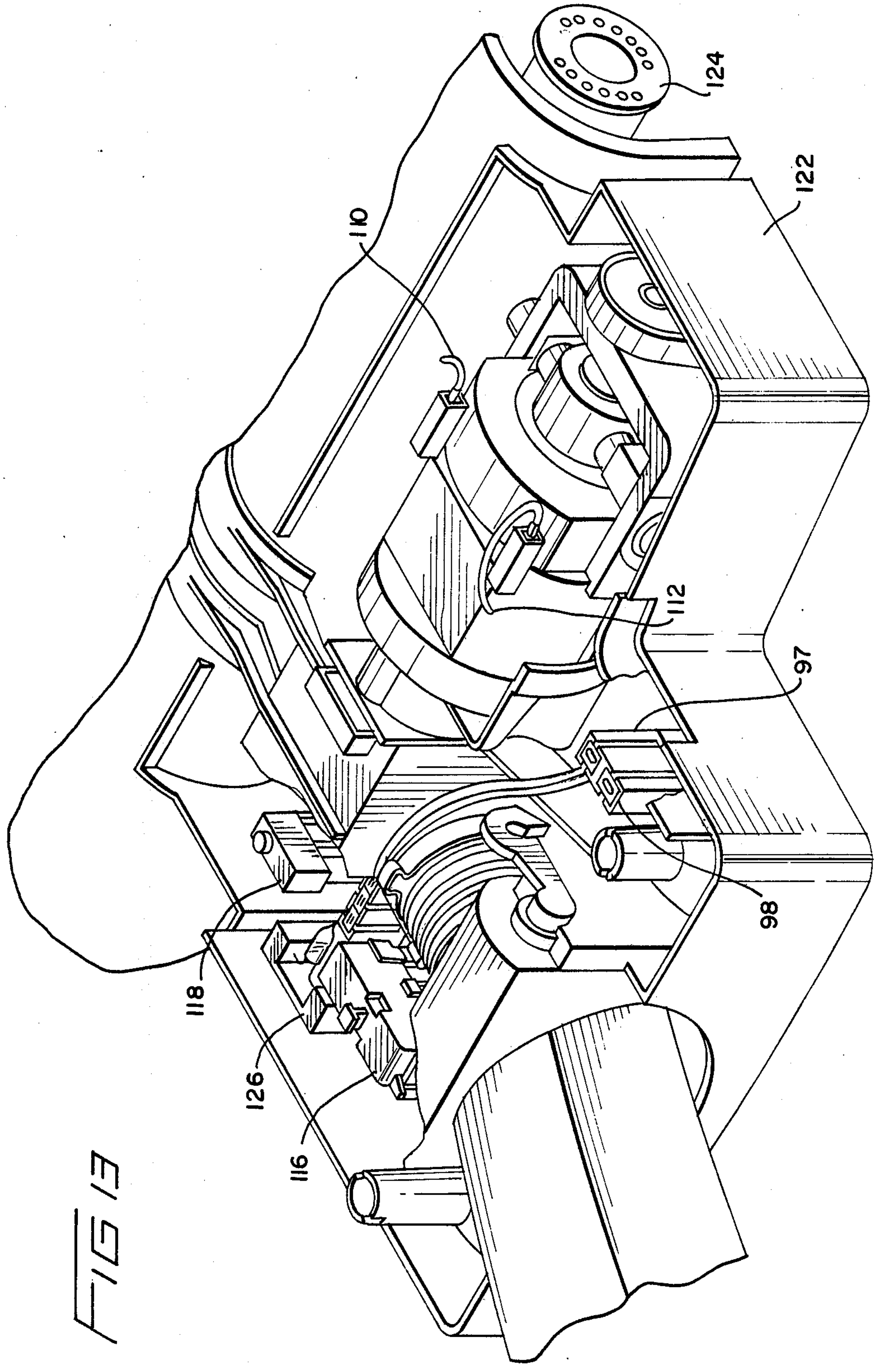
FIG. 13 is a perspective view showing three components inserted as well as two leads of a motor connected into corresponding terminal blocks.

The individual contacts in the terminals shown in FIGS. 11 to 13 can be the contacts 46 shown in FIGS. 6 and 7. These contacts are embedded in NOVODUR plastic which is indicated in terminal 90 by reference numeral 128. The terminal blocks per se are integrally molded as part of the housing 122 and the NOVODUR plastic in the terminal cavity separates the contact 46 from the polyamide plastic of the housing.

With the applicants' invention, the appliance can be wired quickly and often by laying down only a single wire as shown for the vacuum cleaner of FIGS. 11 to 13. Thereafter, the insert contacts are poked into the terminals and the electrical connection made. With the wires now held firmly in place, they can be cut at selected locations to form separate circuit branches for supplying various components. As mentioned, this cutting operation, too, can be performed by robot equipment on the assembly line. Thereafter, the plug-in units are inserted as are the leads having spade contacts of components such as the motor.

With the invention described above, it is possible to manufacture a household apparatus fully automatically.

It is understood that the foregoing description is that of the preferred embodiments of the invention and that various changes and modifications may be made thereto without departing from the spirit and scope of the invention as defined in the appended claims.

What is claimed is:

1. A method of providing a current supply arrangement for a household appliance such as a floor-cleaning apparatus containing a plurality of individual components and having a housing for accommodating the components, the method comprising the steps of:

providing a plurality of terminal block arranged in spaced relationship to each other in the housing, each of said terminal blocks having a predetermined number of slotted cavities;

laying down at least one uninterrupted wire interconnecting selected ones of said slotted cavities;

then inserting a plurality of wire insulation cutting contacts into corresponding ones of said cavities so as to make electrical and mechanical contact with said wire to define terminals in said cavities;

cutting out a segment of said wire between at least one selected pair of said terminals so as to electrically disconnect the terminals of said pair from each other; and, inserting an electrical component across the terminals of said pair.

2. The method of claim 1, wherein said cavities are lined with a lining made of a material suitable for current-conducting parts.

3. The method of claim 2, said housing being made of polyamide plastic and said lining being made of NOVODUR plastic.

4. The method of claim 1, said housing being a clamshell-type housing.

5. A household appliance such as a floor-cleaning apparatus, the apparatus comprising:

a housing having an inside wall surface;

a plurality of electrical components;

a plurality of terminals blocks mounted on said wall surface and arranged in spaced relationship to each other;

each of said terminal blocks having a predetermined number of slotted cavities;

a plurality of wire segments obtained by laying down at least one uninterrupted wire interconnecting said slotted cavities and then cutting out a length of wire between at least one selected pair of said terminals;

each one of said wire segments being disposed in preselected ones of said cavities so as to provide an electrical connection between said preselected ones of said cavities;

a plurality of sets of interconnected cutting contacts;

each one of said sets being assigned to a selected number of cavities in each of a predetermined number of said terminal blocks and the cutting contacts of each set being seated in corresponding ones of the selected number of said cavities;

each of said wire segments being in electrical contact engagement with the electrical contact in the preselected cavity wherein a corresponding wire segment is disposed; and, each of said electrical components being connected across two preselected ones of said cutting contacts.

6. The apparatus of claim 5, said cavities having a lining made of a material suitable for current-conducting parts.

7. The apparatus of claim 6, said housing being made of polyamide plastic and said lining being made of NOVODUR plastic.

8. The apparatus of claim 4, said housing being a clamshell-type housing.

* * * * *

UNITED STATES PATENT AND TRADEMARK OFFICE

CERTIFICATE OF CORRECTION

PATENT NO. : 4,920,456

DATED : April 24, 1990

INVENTOR(S) : Rolf Pirdzuns

It is certified that error appears in the above-identified patent and that said Letters Patent is hereby corrected as shown below:

In column 2, line 28: insert a comma after "and".

In column 2, line 55: delete "are" and substitute -- is -- therefor.

In column 4, line 37: delete "58" and substitute -- 68 -- therefor.

In column 4, line 46: delete "block 53b" and substitute -- blocks 53b -- therefor.

In column 4, line 50: delete "separate" and substitute -- separated -- therefor.

In column 6, line 9: delete "block" and substitute -- blocks -- therefor.

In column 6, line 35: delete "terminals" and substitute -- terminal -- therefor.

In column 6, line 66: delete "claim 4," and substitute -- claim 5, -- therefor

Signed and Sealed this

Twenty-seventh Day of August, 1991

*Attest:*

HARRY F. MANBECK, JR.

*Attesting Officer* *Commissioner of Patents and Trademarks*